US 8,065,912 B2

(12) United States Patent
Spanke

(10) Patent No.: US 8,065,912 B2
(45) Date of Patent: Nov. 29, 2011

(54) FILLING LEVEL SENSOR AND METHOD FOR MEASURING FILLING LEVEL

(75) Inventor: Dietmar Spanke, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 319 days.

(21) Appl. No.: 10/539,114

(22) PCT Filed: Dec. 13, 2003

(86) PCT No.: PCT/EP03/14206
§ 371 (c)(1),
(2), (4) Date: Feb. 2, 2006

(87) PCT Pub. No.: WO2004/059262
PCT Pub. Date: Jul. 15, 2004

(65) Prior Publication Data
US 2006/0169040 A1    Aug. 3, 2006

(30) Foreign Application Priority Data

Dec. 20, 2002 (DE) .................. 102 60 959

(51) Int. Cl.
*G01F 23/00* (2006.01)
(52) U.S. Cl. .................. 73/290 R; 73/290 V
(58) Field of Classification Search .......... 73/290 V, 73/290 R
See application file for complete search history.

(56) References Cited

U.S. PATENT DOCUMENTS

| | | | |
|---|---|---|---|
| 4,551,719 A | 11/1985 | Carlin et al. | |
| 4,793,178 A | 12/1988 | Ahern et al. | |
| 4,853,694 A | 8/1989 | Tomecek | |
| 2003/0093519 A1* | 5/2003 | Jackson et al. | 709/224 |

FOREIGN PATENT DOCUMENTS

| | | |
|---|---|---|
| DE | 3337690 | 4/1985 |
| DE | 04223346 | 5/1996 |
| DE | 19514201 | 4/1997 |
| DE | 10163635 | 10/2003 |
| EP | 00979998 | 2/2000 |

* cited by examiner

*Primary Examiner* — Hezron E Williams
*Assistant Examiner* — Rodney T Frank
(74) *Attorney, Agent, or Firm* — Bacon & Thomas, PLLC

(57) ABSTRACT

A fill-level measuring device for measuring a fill level of a fill substance in a container, which, following a single commissioning, can be used in a plurality of applications. The fill-level measuring device includes: A measuring unit, which serves to produce a measurement signal dependent on the fill-level; a memory, in which parameter sets for different applications are stored; and an evaluating unit, which serves for selecting a parameter set, for deriving, on the basis of this parameter set, the fill level from the measurement signal, and for making such fill level available for further processing, evaluation and/or display.

4 Claims, 3 Drawing Sheets

FILLING LEVEL SENSOR AND METHOD FOR MEASURING FILLING LEVEL

FIELD OF THE INVENTION

The invention relates to a fill-level measuring device and a method for fill-level measurement.

BACKGROUND OF THE INVENTION

Fill level measuring devices are used in a multitude of branches of industry, e.g. in the processing industry, in the chemicals industry and in the foods industry.

A frequently selected type of fill-level measurement is based on the travel-time principle. In such case, e.g. periodically short send-signals, e.g. microwaves or ultrasonic waves, are transmitted to the upper surface of a fill substance, and the echo-signals reflected from the upper surface received back, following a distance-dependent travel time, or time-of-flight. An echo function representing echo amplitude as a function of travel time is formed. Each value of this echo function corresponds to the amplitude of an echo reflected at a certain distance from the antenna.

From the echo function, a wanted echo is determined, which probably corresponds to the reflection of a signal sent to the upper surface of the fill substance. In such case, it is, as a rule, assumed that the wanted echo has a greater amplitude than the remaining echoes. From the travel time of the wanted echo one directly obtains, for a fixed propagation velocity of the transmitted pulse, the distance between the fill substance upper surface and the antenna.

Usually, it is not the received, raw signal which is evaluated, but, instead, its so-called envelope, or hull, curve. The envelope curve is produced by rectifying and filtering the raw signal. For accurate determination of a travel time of the wanted echo, first a maximum of the envelope curve is found.

In order that the wanted echo can be recognized and the associated fill level can be derived therefrom, the fill-level measuring device needs certain information. In determining the fill level, e.g. an installation height of the fill-level measuring device in the container must be considered. If not only the separation between fill-level measuring device and fill substance is to be determined, but, also, a figure for the amount of fill substance present in the container, then the fill-level measuring device must also have access to information concerning the shape of the container.

Besides this information, also data concerning material properties of the fill substance can be important. For example, in the case of fill-level measurement by means of microwaves, such a material property is a dielectric constant of the fill substance. How well the fill substance reflects microwaves, i.e. what fraction of the microwaves is reflected, depends on the dielectric constant of the fill substance. Correspondingly, an estimate of the amplitude to be expected for the wanted echo can be made on the basis of the dielectric constant, a procedure which eases the finding of the correct, wanted echo.

Consequently, in the case of conventional fill-level measuring devices, following installation of the fill-level measuring device, a commissioning is done, in which, among other things, all parameters relevant for the particular application are made available to the fill-level measuring device. The parameters are stored as a parameter set and are ready for use, following the commissioning.

After commissioning, the fill-level measuring device then works independently on the basis of the parameter set.

However, it is not that simple to change the application. Each change that affects a parameter of the parameter set requires a newed commissioning. This can involve considerable time and money.

SUMMARY OF THE INVENTION

An object of the invention is to provide a fill-level measuring device, which can be used, after a single commissioning, in a plurality of applications.

Such is achieved, according to the invention, by a fill-level measuring device for measuring a fill-level of a fill substance in a container, which fill-level measuring device includes
  a measuring unit, which serves to produce a measurement signal dependent on the fill level,
  a memory, in which parameter sets for different applications are stored, and
  an evaluating unit, which serves
    to select a parameter set, and
    on the basis of the selected parameter set, to derive the fill level from the measurement signal, and to make the derived fill level available for further processing, evaluation and/or display.

According to a first further development, there is provided for the fill-level measuring device an on-site interface, via which an operator can input, which parameter set is to be selected.

According to a second further development, there is provided for the fill-level measuring device a communication interface, via which can be input, which parameter set is to be selected.

Additionally, the invention resides in a method for fill-level measurement using a fill-level measuring device of the invention, wherein
  the measuring unit transmits send-signals and receives their echo-signals, and
  the evaluating unit determines fill level by
    examining the echo signals for distinctive structures,
    selecting a parameter set on the basis of the structures, and
    determines fill level by means of the selected parameter set.

Likewise, the invention resides in an arrangement for fill-level measurement using a fill-level measuring device of the invention, wherein
  an apparatus for identifying a present application is provided, and
  a connection between the apparatus and the evaluating unit exists, via which identifications of the apparatus are available to the evaluating unit.

Additionally, the invention resides in a method for fill-level measurement using a fill-level measuring device of the invention, wherein the evaluating unit recognizes, on the basis of the measurement signals, events which require a changing of the parameter set.

In a further development of the method, the identification of which application is present is output for plausibility review or as input for other devices.

BRIEF DESCRIPTION OF THE DRAWINGS

The invention and further advantages will now be explained in greater detail on the basis of the FIGS. of the drawings presenting examples of embodiments of the invention. Equal elements are given equal reference characters in the FIGS. The FIGS. show as follows.

DESCRIPTION OF THE PREFERRED EMBODIMENTS

Figure 1:
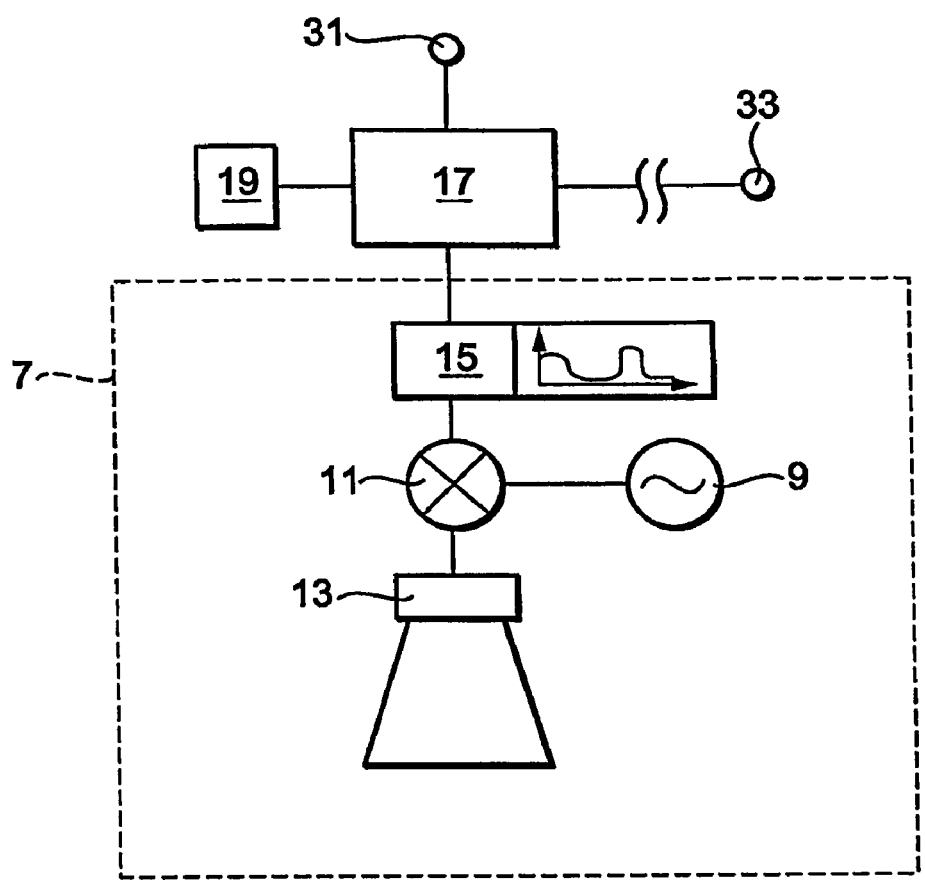
FIG. 1 a fill-level measuring device of the invention.

FIG. 1 shows a fill-level measuring device of the invention, and

Figure 2:
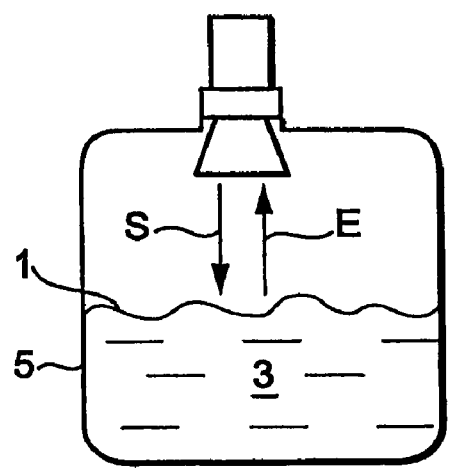
FIG. 2 an arrangement for fill-level measurement.

FIG. 2 shows an arrangement for fill-level measurement, in which the fill-level measuring device of FIG. 1 is mounted on a container 5.

The illustrated example of an embodiment involves a fill-level measuring device that works with microwaves. Other conventional fill-level measuring devices could, as well, be adapted for the invention, examples being fill-level measuring devices working with ultrasound, or capacitive fill-level measuring devices.

The fill-level measuring device serves for measuring a fill level 1 of a fill substance 3 in a container 5 and includes a measuring device 7, which serves to provide a measurement signal dependent on the fill level 1. Measuring device 7 includes, in the case of the illustrated fill-level measuring device working with microwaves, a source 9 of microwaves, which is connected with an antenna 13 via a transmitting/receiving duplexer 11.

During operation, the measuring unit 7 periodically transmits e.g. short send-signals S via antenna 13 from the microwave source 9 in the direction of the fill substance 3 and receives-back their echo-signals E. The echo signals are guided from the antenna 13 via the transmitting/receiving duplexer 11 to a signal preprocessing 15. In the signal preprocessing 15, the echo-signals are conditioned. For example, the echo-signals E can be amplified, rectified and filtered. The signal preprocessing produces a measurement signal, which depends on the fill-level. In the chosen example of an embodiment, this is e.g. an echo-function derived from the echo signal E; compare the graphic illustration of the echo-function in FIG. 1. The echo-function is a plot of echo amplitudes as a function of travel time. The illustrated, marked maximum of the echo-function comes from a reflection on the upper surface of the fill substance.

The measurement signal is fed to an evaluating unit 17, which determines the current fill-level 1 therefrom.

According to the invention, the fill-level measuring device includes a memory 19, in which parameter sets for different applications are stored. The parameter sets include application-specific information required for determining the fill level 1. In this way, it is possible to use one and the same fill-level measuring device in a plurality of different applications. For each application, the required parameter set is already present, ready for call-up, in the memory 19.

The parameter sets are stored in the memory 19 before the first measurement of fill level, e.g. they are stored at the time of a commissioning. In such case, for every possible application in which the fill-level measuring device is to be used, there is stored in the memory 19 a parameter set containing the required, application-specific information, such as e.g. the installation height of the fill-level measuring device in the container, the container geometry, possible installed objects which must not be mistaken for the fill level, the dielectric constant of the fill substance, etc.

The evaluating unit 17 serves for selecting from the stored parameter sets that parameter set, which contains the information relevant for the current application.

A large number of measuring tasks exist, for which it means a clear increase in economy and efficiency, when a fill-level measuring device can be used in different applications without additional effort.

An example of such is manufacturing methods in which containers 5 are filled, one after the other, with fill substances 3 of strongly differing properties, e.g. densities or dielectric constants. Each change of the fill substance 3 means another application for the fill-level measuring device.

In the same way, it can be very cost-saving to measure, with a single fill-level measuring device, fill levels 1, one after the other, in a plurality of containers 5. The fill-level measuring device can, for this purpose, travel, e.g. along a track 27 from one container to the next. This is shown in FIG. 3.

Also, the fill-level measuring device can be mounted on the end of a rod-shaped carrier 29, which is rotatable about its attachment. In this way, the fill-level measuring device can move to a plurality of containers 5 arranged in a circle within reach of the carrier 29. This is illustrated in FIG. 4.

Figure 3:
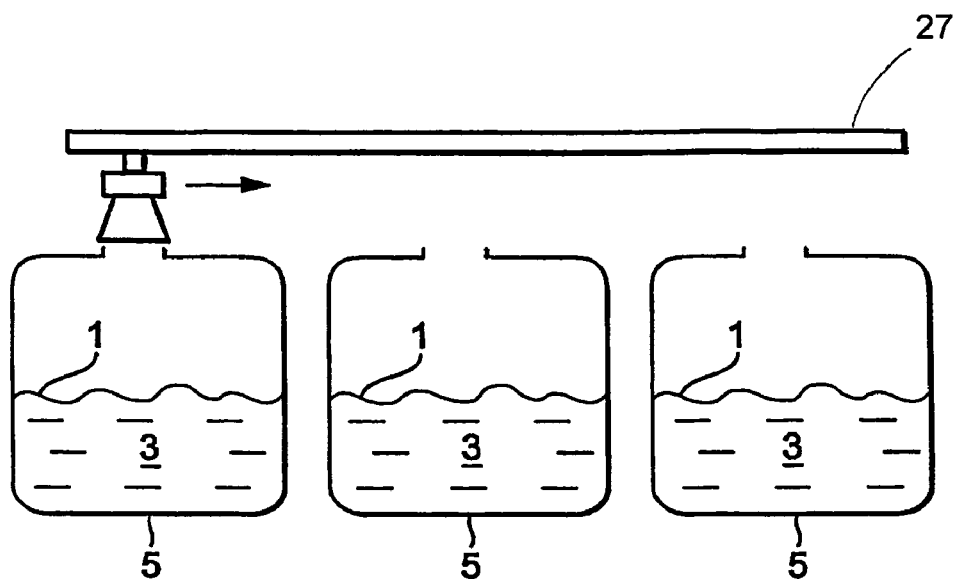
FIG. 3 a fill-level measuring device movable along a track for performing fill-level measurements in a plurality of containers.
Figure 4:
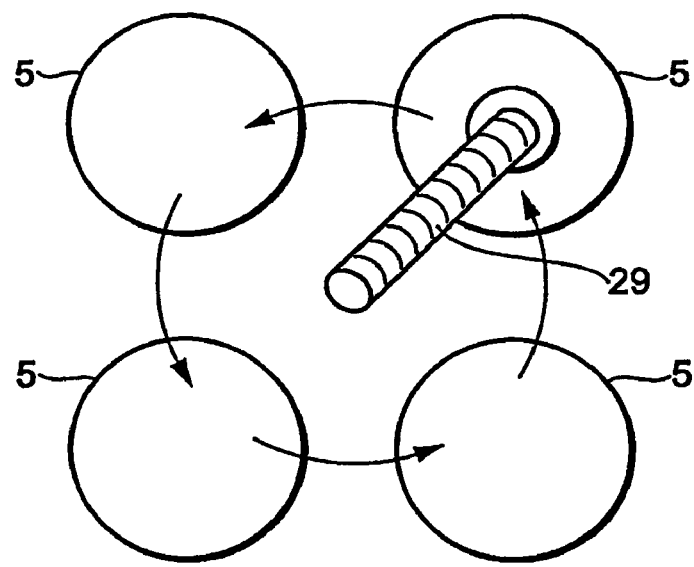
FIG. 4 a fill-level measuring device mounted end-wise on a rod-shaped carrier 29.

Each change of container in the examples shown in FIGS. 3 and 4 corresponds to a new application, in which, in each case, another parameter set must be used.

The selecting of the parameter sets can occur in different ways.

Figure 5:
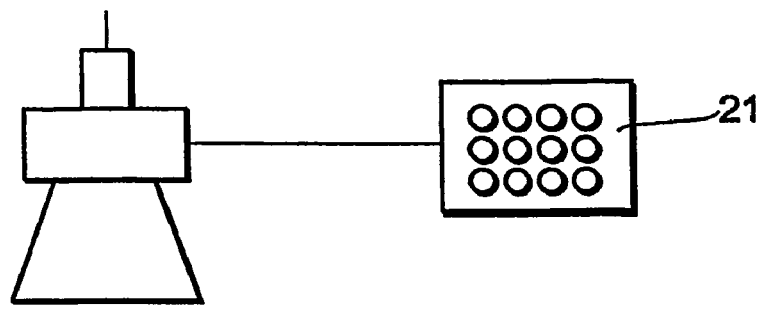
FIG. 5 a fill-level measuring device having an on-site interface.

FIG. 5 illustrates a first example of an embodiment. In this case, an on-site interface 21 is associated with the fill-level measuring device. Via the on-site interface 21, an operator can input, which parameter set is to be selected. Each time, when the application is changed, the operator can perform this input. The input is fed to the evaluating unit 17, which then selects, on the basis of the input, the parameter set needed for the new application.

Figure 6:
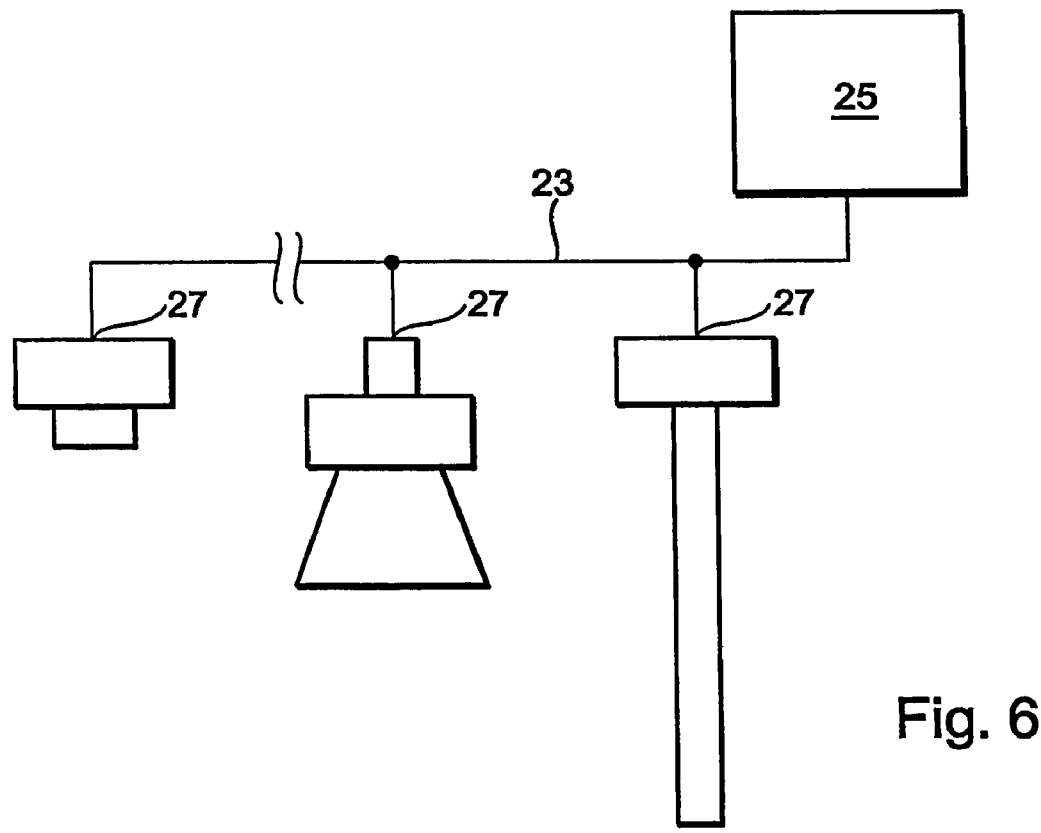
FIG. 6 a plurality of fill-level measuring devices connected via a bus system to a superordinated unit.

Alternatively, there is associated with the fill-level measuring device a communication interface, via which the input then occurs, as to which parameter set is to be selected. This form of embodiment saves the operator from having to travel the distance to the on-site interface 21. It is, therefore, always preferably used, when the fill-level measuring device is a component of a larger plant. In larger plants, measuring devices are frequently connected via a bus system 23 to a superordinated unit 25, e.g. a process control station or a programmable logic controller. FIG. 6 shows the basic principles of such a plant having three fill-level measuring devices connected to the superordinated unit 25 via the bus system 23. Each fill-level measuring device is connected to the bus system 23 via a communications interface 24. In the case of this example of an embodiment, it can be reported to the fill-level measuring device, or its equivalent unit 17, from the superordinated unit 25, in which application the particular fill-level measuring device is now being used.

A further, especially advantageous form of the selecting of the correct parameter set lies in a method for fill-level measurement using the fill-level measuring device of the invention, wherein the measuring unit 7 transmits send-signals S and receives their echo-signals E. The transmission of send-signals S and the receiving of their echo-signals E is performed in a usual way, as explained above, for fill-level measuring devices working according to the travel-time principle.

The evaluating unit 17 then determines the fill level 1 by first examining the echo-signals E for distinctive structures. Distinctive structures are e.g. disturbance echoes produced by solid objects installed in the container 5, an echo from a floor of the container 5, or a significant behavior of the echo-signal E in the area of the antenna 11.

On the basis of the distinguishing structures, the evaluating unit 17 recognizes which application of the fill-level measuring device is being used at the moment and, on such basis, selects the parameter set belonging to those structures. Then, using the parameter set belonging to the application, the evaluating unit 17 determines the fill level 1.

A special advantage of this method is that the fill-level measuring device does not need any input. It recognizes, on its own, which application is present at the moment. This recognition can, additionally, be output as a plausibility check or as input for other devices not in a position to automatically recognize the current application.

If the above-described method is not applicable, e.g. because no distinctive structures are present, by which the applications can be distinguished, then, alternatively, an arrangement for fill-level measurement can be used, which, along with the fill-level measuring device, provides an apparatus for identifying a present application.

This will now be explained in further detail, by way of example, on the basis of the arrangements illustrated in FIGS. 3 and 4. In both examples of embodiments, the application results from the position of the fill-level measuring device. Correspondingly, the apparatus for identifying the present application can have e.g. a set of light barriers placed at the measurement locations, or push-switches can be provided, which are switched by the passing fill-level measuring device. Likewise, the position of the fill-level measuring device can be registered by an apparatus, which registers the motor position of a motor causing the movement of the fill-level measuring device along the track or a rotation of the carrier 29.

In order that this information can be fed to the fill-level measuring device, there is a connection 31 between the apparatus and the evaluating unit 17, and the identifications of the apparatus are made available to the evaluating unit 17 over this connection 31. The connection 31 can be designed, for example, for analog signals, for digital signals, or for a bus communication. An end of the connection at the fill-level measuring device is shown in FIG. 1. It is embodied in the illustrated example as a connection point for the apparatus, which is connected directly to the evaluating unit 17.

The selection of the parameter set correct for the particular application present at a given time can, however, also occur via a method for fill-level measurement, in which the evaluating unit recognizes, on the basis of the measurement signals, events, which make a changing of the parameter set necessary.

Such events can be triggered e.g. by a moving of the fill-level measuring device from one container 5 to another, such as occurs, for example, in the examples of embodiments illustrated in FIGS. 3 and 4. The shifting of the fill-level measuring device is registered by the fill-level measuring device as a sudden fill-level change. A sudden fill-level change is, thus, such an event, which makes a parameter change necessary.

The triggering events can, however, also, in the case of a manufacturing process performed in a single container 5, be given by the manufacturing process itself. This is, for example, the case, when different fill substances 3 are sequentially filled into the container 5. The manufacturing process specifies in which sequence the separate fill-substances 3 are to be charged in, or let out, as the case may be. If, now, knowing the manufacturing process, the fill level 1 is measured and its chronological development followed, then a matching of this sequence can be made. In this way, the events are fill-level rises, or fill-level declines, occurring at a certain stage in the manufacturing process.

The evaluating unit 17 serves, in such case, not only for selecting the parameter set; following such selection, it serves, also, for deriving the fill level from the measurement signal M on the basis of the selected parameter set and for making the result available for further processing, evaluation and/or display. The output can occur, for example, via an output stage 33, such as is illustrated in FIG. 1.

The invention claimed is:

1. A fill-level measuring device for measuring a fill-level of a fill substance in a container, comprising:
   a measuring device, which serves to produce a measurement signal dependent on the fill level in the container;
   a memory, in which for every possible application in which the fill-level measuring device is to be used, there is stored in memory a parameter set; and
   an evaluating unit, which serves to select a parameter set, and on the basis of the selected parameter set, derives the fill level from the measurement signal, and makes the derived fill level available for further processing, evaluation and/or display, wherein:
   said measuring device includes preprocessing means for conditioning the measurement signal generated in said measurement device.

2. The fill-level measuring device as claimed in claim 1, in combination with an on-site interface, via which an operator can input, which parameter set is to be selected.

3. The fill-level measuring device as claimed in claim 1, in combination with a communication interface, via which an operator can be input, which parameter set is to be selected.

4. The fill-level measuring device as claimed in claim 1, wherein:
   each parameter set is stored in memory at the time of commissioning.

* * * * *